United States Patent
Kazmi et al.

(10) Patent No.: US 9,295,079 B2
(45) Date of Patent: Mar. 22, 2016

(54) METHODS AND ARRANGEMENTS FOR HANDLING UNRELIABLE SCHEDULING GRANTS IN A TELECOMMUNICATION NETWORK

(75) Inventors: Muhammad Kazmi, Bromma (SE); Walter Muller, Upplands Vasby (SE); Rutger Andersson, Kista (SE); Dirk Gerstenberger, Kista (SE); Joakim Bergström, Stockholm (SE); Stefan Parkvall, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 578 days.

(21) Appl. No.: 13/356,914

(22) Filed: Jan. 24, 2012

(65) Prior Publication Data
US 2012/0120899 A1      May 17, 2012

Related U.S. Application Data

(62) Division of application No. 11/815,733, filed as application No. PCT/EP2005/052275 on May 18, 2005, now Pat. No. 8,526,357.

(30) Foreign Application Priority Data

Feb. 7, 2005    (SE) ................... 0500311.6

(51) Int. Cl.
  H04W 4/00      (2009.01)
  H04W 72/12     (2009.01)
  H04B 7/26      (2006.01)
  (Continued)

(52) U.S. Cl.
  CPC ........... *H04W 72/1294* (2013.01); *H04B 7/264* (2013.01); *H04W 52/24* (2013.01); *H04W 72/14* (2013.01); *H04W 28/04* (2013.01)

(58) Field of Classification Search
  USPC ......... 370/328, 331, 338, 230, 236, 278, 280, 370/329, 332, 335, 341, 343, 388, 390, 394, 370/401, 431, 432, 462; 455/522; 714/748, 714/746, 749, 750, 751
  See application file for complete search history.

(56) References Cited

U.S. PATENT DOCUMENTS 6,463,296 B1    10/2002   Esmailzadeh et al.
7,054,635 B1 *   5/2006   Ritzen et al. .................. 455/444
(Continued)

FOREIGN PATENT DOCUMENTS

GB        2402021 A      11/2004
JP     H09-312609 A      12/1997
(Continued)

OTHER PUBLICATIONS

Ericsson: "Introduction of E-DCH". 3GPP TSG-RAN WG1 Meeting #39. R1-041512. Yokohama, Japan. Nov. 15-19, 2004.
(Continued)

*Primary Examiner* — Phuongchau Ba Nguyen

(57) ABSTRACT

The present invention relates to methods and arrangements for handling unreliable scheduling grants in a WCDMA-communication system. A user equipment detects that a received scheduling grant is unreliable and adjust its serving grant based on that information. The user equipment is also able to report continuously received unreliable grants as an event to the network, allowing the network to adapt its operation to reduce the unreliable grants.

17 Claims, 6 Drawing Sheets

(51) Int. Cl.
*H04W 72/14* (2009.01)
*H04W 52/24* (2009.01)
*H04W 28/04* (2009.01)

(56) References Cited

U.S. PATENT DOCUMENTS

| | | |
|---|---|---|
| 7,116,978 B2 | 10/2006 | Baker et al. |
| 7,310,499 B2 | 12/2007 | Magnusson et al. |
| 7,340,268 B2 | 3/2008 | Oh et al. |
| 7,490,151 B2 * | 2/2009 | Munger et al. ............... 709/225 |
| 7,496,373 B2 | 2/2009 | Salonaho et al. |
| 7,634,288 B2 | 12/2009 | Hakao |
| 7,720,072 B2 | 5/2010 | Tan et al. |
| 7,773,567 B2 | 8/2010 | Heo et al. |
| 2002/0082038 A1 | 6/2002 | Mochizuki |
| 2003/0050097 A1 * | 3/2003 | Amirijoo et al. ............... 455/560 |
| 2003/0054829 A1 * | 3/2003 | Moisio ............... 455/452 |
| 2003/0210668 A1 * | 11/2003 | Malladi et al. ............... 370/335 |
| 2004/0009782 A1 | 1/2004 | Shimizu |
| 2004/0018850 A1 * | 1/2004 | Ishiguro et al. ............... 455/522 |
| 2004/0043783 A1 * | 3/2004 | Anderson ............... 455/522 |
| 2004/0146016 A1 | 7/2004 | Kim et al. |
| 2004/0223507 A1 | 11/2004 | Kuchibhotla et al. |
| 2005/0025100 A1 | 2/2005 | Lee et al. |
| 2005/0026641 A1 | 2/2005 | Hokao |
| 2005/0135289 A1 | 6/2005 | Han et al. |
| 2006/0031563 A1 | 2/2006 | Sebire et al. |
| 2006/0035642 A1 * | 2/2006 | Farnsworth et al. ............... 455/450 |
| 2006/0159061 A1 * | 7/2006 | Takano et al. ............... 370/352 |
| 2006/0206617 A1 * | 9/2006 | Rey et al. ............... 709/231 |
| 2006/0215604 A1 | 9/2006 | Mueckenheim et al. |
| 2006/0268773 A1 | 11/2006 | Ranta-aho et al. |
| 2007/0086381 A1 | 4/2007 | Lee et al. |
| 2007/0183451 A1 | 8/2007 | Lohr et al. |
| 2008/0089296 A1 | 4/2008 | Kazmi et al. |
| 2008/0253300 A1 | 10/2008 | Wakabayashi et al. |
| 2008/0254804 A1 | 10/2008 | Lohr et al. |
| 2009/0016278 A1 | 1/2009 | Wakabayashi |
| 2009/0312023 A1 | 12/2009 | Kazmi |

FOREIGN PATENT DOCUMENTS

| | | |
|---|---|---|
| JP | H09-321609 A | 12/1997 |
| WO | WO 2004/014097 A1 | 2/2004 |
| WO | WO 2005/002083 A1 | 1/2005 |

OTHER PUBLICATIONS

3GPP TS 25.214 V6.2.0 (Jun. 2004). $3^{rd}$ Generation Partnership Project; Technical Specification Group Radio Access Network; Physical Layer Procedures (FDD) (Release 6) R1-041521.

Nokia, Nortel: "Proposed Rewording on scheduler sections compared to CR 001r3". 3GPP TSG RAN2 Meeting #45. Nov. 15-19, 2004. Shin-Yokohama, Japan. R2-042728.

3GPP $3^{rd}$ Generation Partnership Project; Technical Specification Group Radio Access Network, "CR on introduction of EUL in MAC specification". TSG RAN WG2 Meeting #45. Oct. 15-19, 2004. Shin-Yokohama, Japan. R2-042739.

Hamabe, K.: Adjustment look transmit power control during soft handover in CFMA cellular systems Vehicular Technology Conference, 2000, IEEE VTC 2000 $52^{nd}$ Sep. 24-28, 2000. Piscataway, NJ. IEEE vol. 4, 24. pp. 1519-1523. XP010524294.

3GPP TS 25.101 (Dec. 2004) 3rd Generation Partnership Project; Technical Specification Group Radio Access Network; User Equipment (UE) radio transmission and reception (FDD) (Release 6).

3GPP TS 25.211 V6.3.0 (Dec. 2004) $3^{rd}$ Generation Partnership Project; Technical Specification Group Radio Access Network; Physical channels and mapping of transport channels onto physical channels (FOD) (Release 6).

3GPP TS 25.214 V6.4.0 (Dec. 2004) $3^{rd}$ Generation Partnership Project; Technical Specification Group Radio Access Network; Physical layer procedures (FDD) (Release 6).

3GPP TS 25.302 V6.2.0 (Dec. 2004) $3^{rd}$ Generation Partnership Project; Technical Specification Group Radio Access Network; Services provided by the physical layer (Release 6).

3GPP TS 25.321 V6.3.0 (Dec. 2004) $3^{rd}$ Generation Partnership Project; Technical Specification Group Radio Access Network; Medium Access Control (MAC) protocol specification (Release 6).

3GPP TS 25.331 V6.4.0 (Dec. 2004) $3^{rd}$ Generation Partnership Project; Technical Specification Group I Radio Access Network; Radio Resource Control (RRC); Protocol Specification (Release 6).

* cited by examiner

METHODS AND ARRANGEMENTS FOR HANDLING UNRELIABLE SCHEDULING GRANTS IN A TELECOMMUNICATION NETWORK

CLAIMING BENEFIT OF CO-PENDING APPLICATION

This application is a Divisional Application of U.S. patent application Ser. No. 11/815,733, filed on Aug. 7, 2007, now U.S. Pat. No. 8,526,357, (issued Sep. 3, 2013), which is a 371 of PCT Patent Application No. PCT/EP05/52275, filed May 18, 2005, which claims priority to Swedish Patent Application No. 0500311.6, filed Feb. 7, 2005.

TECHNICAL FIELD

The present invention relates to communication systems in general, specifically to methods and arrangements for handling unreliable scheduling grants in a WCDMA-communication system.

BACKGROUND

In WCDMA enhanced uplink the Node B sends scheduling commands to the user equipments (UE) at every Transmission Time Interval (TTI), which at present can be either 2 ms or 10 ms. Each user equipment maintains a serving grant (SG) by increasing or decreasing its transmitted bit rate as dictated by the scheduling grants received from the network. This change in the transmitted bit rate is in turn achieved by applying the selection of the Transport Format Combination (TFC) in the user equipment.

A scheduling grant or scheduling grant message provides an indication from e.g. the Node B of both serving and non-serving radio link sets to the user equipment about the maximum amount of uplink resources it may use. The scheduling grants are sent once per Transmission Time Interval or even less frequently. The serving grant (SG) represents the uplink resources that the user equipment is presently utilizing on the serving radio link set i.e. bit rate.

The following two types of grant channels have been specified [1] [2] in the standard according to prior art: Enhanced Relative Grant Channel (E-RGCH) and Enhanced Absolute Grant Channel (E-AGCH). The E-RGCH channel is transmitted by a serving radio link set (RLS) as well as by one or several non-serving RLS:s. This is shown in FIG. 1. The serving RLS transmits the commands "DOWN", "UP", and "HOLD", which may correspond, e.g., to −1, +1, and 0 respectively. On the other hand, non-serving RLS:s transmits either "DOWN" or "HOLD", which may correspond to +1 or 0 respectively. Only the serving RLS uses the E-AGCH channel to send the absolute grant, which corresponds to the maximum allowed bit rate for the user equipment.

In soft handover (SHO) the user equipment receives absolute and/or relative grants from the serving RLS, whereas the non-serving RLS sends only the relative grant. If any of the relative grants is "DOWN", the user equipment estimates its New SG as follows according to prior art:

New SG=last bit rate used−δ

The δ in the above equation may correspond to the user equipment transmit power or bit rate. If none of the relative grants is "DOWN" then the New SG will be according to the absolute/relative grants received from the serving RLS.

The existing solutions according to prior art imply at least two problems:

Firstly, not all scheduling grants are reliable. There is always a risk that the power of the grant is such that, e.g., a "DOWN" grant can be erroneously treated as a "HOLD" grant, which in turn results in too much interference in the system.

Secondly, the network is not aware whether the scheduling grants that it is transmitting are reliable or not.

Therefore, there is a need for solutions providing handling of unreliable scheduling grants at the user equipment and for reducing the occurrence of unreliable grants in the network.

SUMMARY

It is an object of the present invention to provide methods and arrangements for handling unreliable scheduling grants in a communication system, more specifically it is an object of the present invention to enable a user equipment to estimate new serving grants based on reliable and unreliable scheduling grants and to enable a communication network to handle unreliable scheduling grants.

It is a further object of the present invention to enable a communication network to improve the reliability of the scheduling grants.

Briefly, according to the invention a user equipment detects that a received scheduling grant is unreliable and adjust its serving grant based on that information. According to a specific embodiment, the user equipment is also able to report continuously received unreliable grants as an event to the network, allowing the network to adapt its operation to reduce the unreliable grants. The term continuously is used in the sense that a plurality of consecutive received scheduling grants are unreliable.

The invention proposes a new method in a user equipment in response to receiving unreliable scheduling grants. The method generally includes: the user equipment detects unreliable received relative scheduling grants; the user equipment takes appropriate action, i.e. adjust its serving grant to prevent interference.

Optionally the user equipment reports an event to the network if grants are continuously received unreliably. Subsequently, and optionally, the network adjusts the power offset of the grant channel and/or the downlink load of the corresponding cell.

Advantages of the present invention include:

The unreliable scheduling grants will be detected by the user equipment and such grants shall not be taken into account during soft handover combining process.

The user equipment does not transmit at a rate higher than the network can tolerate, preventing bad uplink reception quality.

The user equipment transmits at a rate, which in some scenario can allow the base station to detect that it is transmitting an unreliable grant.

The network is able to know if the scheduling grants are received reliably or not.

The network will be able to take some radio resource management (RRM) actions, which will eventually alleviate the problem of transmitting unreliable grants.

BRIEF DESCRIPTION OF THE DRAWINGS

The invention, together with further objects and advantages thereof, may best be understood by making reference to the following description taken together with the accompanying drawings, in which.

ABBREVIATIONS

UE User Equipment
UL TPC Uplink Transmit Power Control
E-RGCH Enhanced Relative Grant Channel
E-AGCH Enhanced Absolute Grant Channel
TTI Transmission Time Interval
SG Serving Grant
TFC Transport Format Combination
RLS Radio Link Set
E-DCH Enhanced Dedicated Channel
WCDMA Wideband Code Division Multiple Access
RRM Radio Resource Management
3GPP $3^{rd}$ Generation Partnership Project
RNC Radio Network Controller
SHO Soft Handover

DETAILED DESCRIPTION

A first problem with prior art is that the user equipment (UE) does not carry out any reliability check of the received scheduling grants, which might cause the UE to misinterpret the grants especially for soft handover. In other words, some grant messages received by the UE can be unreliable. This could happen due to number of reasons: noisy link, lower transmit power on the grant channel due to inappropriate power setting on the grant channels, bad UE receiver performance, etc.

For instance, in case a "DOWN" grant is interpreted as "HOLD", the user equipment will follow the scheduling grant from the serving RLS, which may lead to excessive interference at the non-serving or neighboring cells. On the other hand, detection of "HOLD" as "DOWN" will lead to throughput loss. It is important to note that the base station does not have any information about the load situation in the neighboring cells implying that all the base stations send their respective scheduling grants independently.

The false detection of "DOWN" as "HOLD" is a more extreme situation since there will be an impact on the uplink interference. However, there is also throughput loss if "UP" (from the serving RLS) is interpreted as "HOLD" or "HOLD" (from neighboring cell) is interpreted as "DOWN". Similarly, the network or base stations will experience more interference if the UE treats "HOLD" (from the serving RLS) as "UP".

Another problem with the current solution is that the communication network is not aware whether the transmitted grants are reliable or not, i.e. there is no mechanism by which the network can be informed that the received grants are unreliable. This means that a plurality of unreliable grants could be continuously transmitted without any corrective action by the network, resulting in excessive interference in the neighboring cells.

Basically, the present invention addresses the handling of unreliable scheduling grants in a user equipment and a network. The user equipment identifies such unreliable grants and treat them according to one of the possible embodiments stated below in the detailed description while the network then assures reliability by help of one of the embodiments as stated below in the detailed description. The solution according to the present invention is applicable but not limited for single link and particularly advantageous in soft handover scenarios.

Figure 1:
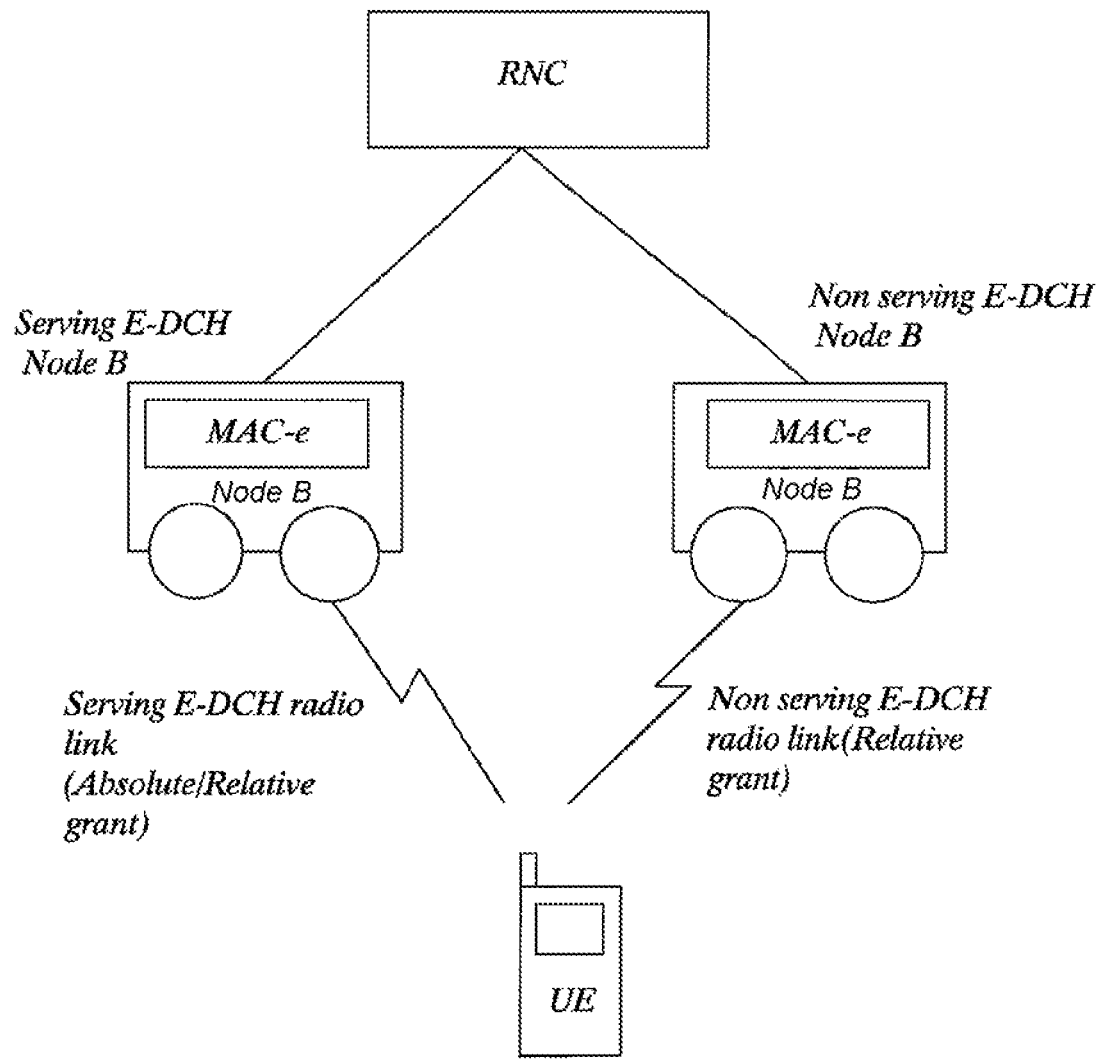
FIG. 1 illustrates the transmission of scheduling grants in E-DCH.

The invention will be described in the context of a user equipment UE communicating with a serving radio link set RLS and receiving scheduling grants from both the serving RLS and at least one non-serving RLS, as is illustrated in FIG. 1.

With reference to FIG. 1 a basic situation in which the present invention can be applicable is that a user equipment (UE) receives a plurality of relative scheduling grants from the serving RLS and at least one non-serving RLS. The UE needs to detect if any of the relative grants from the non-serving RLS is reliable or not. One indication of an unreliable scheduling grant is that the received power from the grants channel lies in one of the unreliable power regions or intervals $\delta_1, \delta_2$ indicated in to FIG. 2.

Upon detection of at least one unreliable scheduling grant the UE needs to take appropriate action to dynamically adapt its serving grant (SG) such that the neighboring cells do not receive excessive interference. In the following a number of embodiments for this adjustment will be described.

Figure 2:
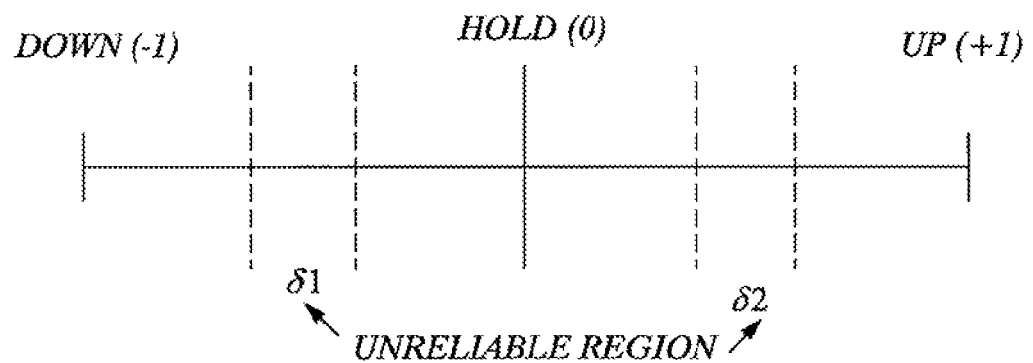
FIG. 2 illustrates unreliable power regions for relative scheduling grants.

Basically, the UE needs to detect if any of the relative grants received from the non-serving RLS is reliable or not. Unreliability can be detected, e.g., if the received power from the grant channel lies in an unreliable region or power interval $\delta_1, \delta_2$, as illustrated in FIG. 2. The region is unreliable in the sense that for a grant with a received power within that interval it is difficult to distinguish a "DOWN" grant from a "HOLD" grant, and to distinguish a "HOLD" grant from an "UP" grant. If any of the relative grants is unreliable the UE adapts the serving grant (SG) such that the neighboring cells don't receive excessive interference. In other words, the UE dynamically adapts its SG.

Figure 3:
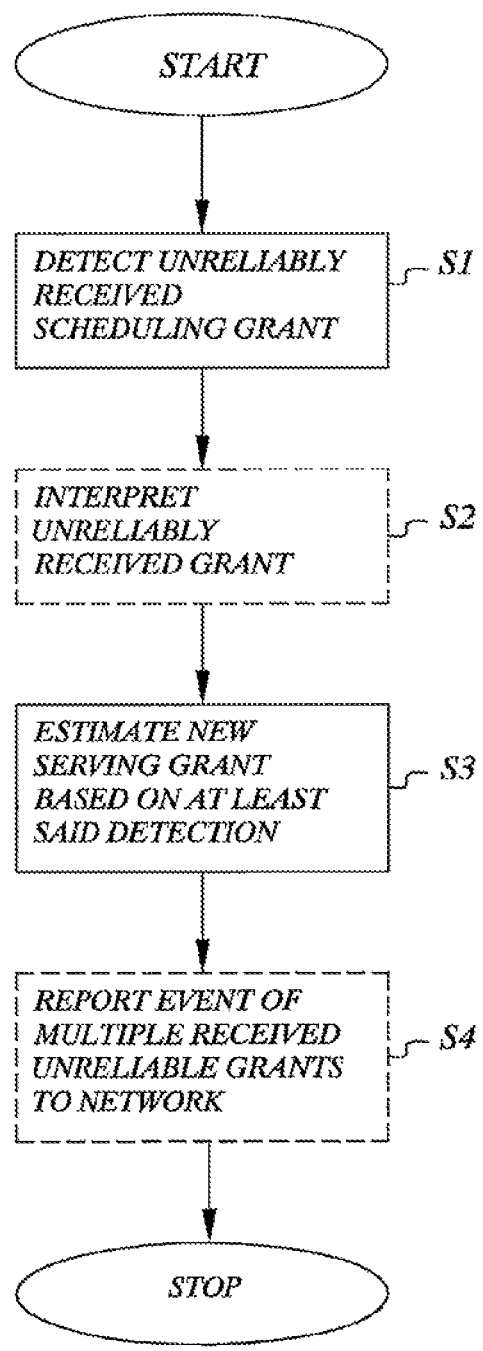
FIG. 3 is a schematic flow diagram of an embodiment of a method according to the invention.

With reference to FIG. 3, according to a basic embodiment of a method, a user equipment detects S1 that at least one received scheduling grant is unreliable, subsequently the UE evaluates or interprets S2 the unreliable grant(s) and estimates S3 a new serving grant based at least on the interpretation.

According to a specific embodiment, if the user equipment receives a plurality of consecutive unreliable scheduling grants it reports S4 an event to the network, i.e. the radio network controller.

According to the preferred embodiment, the user equipment interprets or evaluates S2 the detected unreliable scheduling grants, and estimates S3 the new serving grant based on that interpretation.

According to an alternative embodiment, a scheduling grant is detected S1 as unreliable if the received power is within a predetermined power interval or region. There is a first such unreliable region $\delta_1$ between the "DOWN" command and the "HOLD" command, and second region $\delta_1$ between the "HOLD" command and the "UP" command.

In the following, a number of specific embodiments concerning the evaluation or interpretation S2 of the unreliable scheduling grants and the estimation S3 of new serving grants will be described.

Generally, the user equipment interprets the unreliable scheduling grant based on some criteria, and estimates the new serving grant based on that interpretation. Also, the interpreting step can comprise ignoring an unreliable grant, thus not using the unreliable grant in the estimation of the new serving grant. Further, the interpretation can be aided by some additional measurements. However, the collective idea of the embodiments is that the UE detects that a scheduling grant is unreliable, and takes this into consideration when estimating the new serving grant.

According to a preferred embodiment of the present invention, the UE evaluates or interprets S2 received unreliable relative scheduling grants as "HOLD" when estimating S3 the new serving grant. This means that the UE shall follow other reliable grant(s). In case all the relative grants are unreliable the UE shall treat all the grants are "HOLD", this means the serving relative grant will not change. Possible combinations of relative grants are listed below:

"UP" and "Unreliable"→"UP"
"DOWN" and "Unreliable"→"DOWN"
"HOLD" and "Unreliable"→"HOLD"
"Unreliable" and "Unreliable"→"HOLD"

According to another specific embodiment of the present invention, the UE disregards the relative scheduling grant from non-serving RLS when at least one relative grant is unreliable. The evaluating step S2 in this case means that the unreliable relative scheduling grant is determined never to have been received. This means that the UE maintains the last serving grant for which the corresponding relative grants all were reliable. Hence, the UE estimates S3 its serving grant (SG) as follows:

$$SG(k)=SG(m)$$

where k denotes the current TTI, and m is the last TTI, when the UE has received reliable relative grants from all the RLS. Possible combinations of grants comprise:

"UP" and "Unreliable"→"HOLD"
"DOWN" and "Unreliable"→"HOLD"
"HOLD" and "Unreliable"→"HOLD"
"Unreliable" and "Unreliable"→"HOLD"

However, the embodiment described above does not provide precautions for the case that the UE still transmits at a too high data rate if one of the RLS wants to decrease the transmitted bit rate. Hence, a further specific embodiment is a further elaboration of this embodiment, that in case of one or more unreliable grants, the UE only follows the "DOWN" grant or a new serving grant if that grant is lower than the previous grant:

$$SG(k)=\min\{SG(m), G_{serv\_cell}(k)\}$$

where $G_{serv\_cell}$ denotes the scheduling grant (relative or absolute) received from the serving cell in the current TTI. Possible combinations of grants comprise:

"UP" and "Unreliable"→"HOLD"
"DOWN" and "Unreliable"→"DOWN"
"HOLD" and "Unreliable"→"HOLD"
"Unreliable" and "Unreliable"→"HOLD"

It is still another specific embodiment that the network sends uplink interference thresholds, i.e. the user equipment UE receives such thresholds, common for all cells or different for different cells, for the neighboring cells in the neighboring cell lists. When unreliable scheduling grant(s) is/are detected S1, the UE then measures the path loss to the neighboring cell and estimate the UL interference. The UE then adjusts its transmit power using the TFC selection in order to keep the UL interference below the threshold set by the network. In this way, the interference on the neighboring cells can be avoided. This method has the advantage that there is a maximum interference limit that the UE can cause to any neighboring cell even if the grant signaling is totally unreliable. Even if the downlink is totally gone for a while, the UE will be able to limit the interference caused. A cell that is not in the active set is protected just before it is about to be added to the active set and becomes a non-serving or serving cell. Further, the UE may also be able to transmit at higher rate, unlike the previous embodiments, if the estimated interference is low. The idea of setting uplink interference thresholds to avoid interference can also be applied to other types of uplink channels, e.g. simple DCH.

This embodiment can be used in combination with all the previous embodiments of the invention.

According to yet another specific embodiment of a method according to the invention, it is possible for the UE to utilize other information for evaluating or interpreting an unreliable relative scheduling grant from the network.

In E-DCH transmission fast power control is used. If radio links are unreliable, the UE may, according to a specific embodiment, also utilize the UL TPC commands, which are sent on the downlink, i.e. from the node B to the UE, to assist the interpreting of relative grants from the non-serving RLS, i.e. the UL TPC commands can indicate the quality of the uplink. An UL TPC command "DOWN" implies that the uplink of the corresponding radio link is good and vice versa. If UL TPC command is "DOWN" (i.e. good uplink) and the scheduling grant is unreliable, then the UE can interpret the scheduling grant as "HOLD". Hence, the UE can then simply follow the grant from the serving cell. Similarly, if TPC command is "UP" (i.e. bad uplink) and the scheduling grant is "unreliable", then the UE can consider the scheduling grant as "DOWN".

When assuming '1' as logical value for the "DOWN" UL TPC command and '0' as the logical value for the "UP" UL TPC command and when denoting $$TPC_{UL\_TTI} = \begin{cases} 1; & \text{UP Command} \\ 0; & \text{DOWN Command} \end{cases}$$

the algorithm can be summarized as follows:
If the received 'Relative Grant' Rx is unreliable then $$R_g=(-1)\cdot TPC_{UL\_TTI} R_g=-1\times TPC_{UL\_TTI}.$$

Note that $R_g=(-1)$ means "DOWN" and $R_g=0$ means "HOLD".

$TPC_{UL\_TTI}$ is based on the combined decisions of all the $TPC_{UL}$ commands received during one TTI (2 ms or 10 ms), e.g. if the majority of $TPC_{UL}$ are UP, then $TPC_{UL\_TTI}$ is UP and vice versa.

This solution is feasible in case the TPC commands are also detected reliably. According to the document 3GPP TS25.101 "UE radio transmission and reception (FDD)" [6] issued by the 3$^{rd}$ Generation Partnership Project the UE is required to detect if the received TPC commands are reliable or not. However, there is no indication to the network if the TPC commands are received reliably or not. Therefore, it must also be proposed that the UE does an event reporting in case a number M of TPC commands are unreliable during a certain time (the same principle as for unreliable grants described above). Consequently, the network can increase the power offsets on the DL DPCCH or reduce the downlink load to ensure that the subsequent UL TPC commands are also received reliably. Currently the UE reports an out-of-sync, which is an extreme situation where the link is about to be disconnected.

The above-described examples comprise the case for two received scheduling grants. However, the same principle applies to cases with more than two scheduling grants.

The above-described embodiments act so as to enable the user equipment to properly evaluate unreliable scheduling grants, but do not give any indication on how to reduce the occurrence of unreliable grants. Consequently, network measures are necessary in case of unreliable grants. This is necessary in order to reduce the number of unreliable transmitted scheduling grants and consequently reducing the unnecessary interference in the system.

Figure 4:
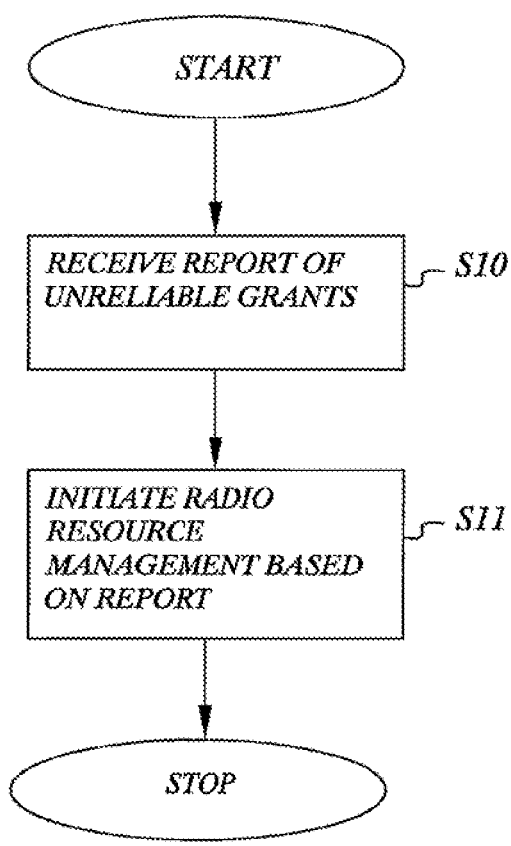
FIG. 4 is a schematic flow diagram of another embodiment of a method according to the invention.

With reference to FIG. 4, according to a basic embodiment of a method of the invention, the network receives S10 a report in the event of continuously received unreliable scheduling grants from a user equipment, and initiates S11 an adjustment of power offsets for the scheduling grant channels in the system.

If received scheduling grants in a soft handover scenario are unreliable, the UE can use the possible solutions as explained above for the user equipment to ensure that the neighboring cells are not interfered. However, it is also important that the network is informed if the scheduling grants are continuously transmitted unreliably. This will allow the network to take some radio resource management (RRM) related actions.

One proposed embodiment of this solution is that if N scheduling grants are received unreliably over a measurement period of $T_1$ ms, then this event ($U_g$) is reported S4 to and received at S10 a serving network unit e.g. the radio network controller (RNC) using RRC signaling. The network configures the values of the parameters (N and $T_1$) using RRC signaling. If the network receives S10 the event ($U_g$) from the UE, it takes some radio resource management measures S11 to ensure that the UE receives the subsequent scheduling grants reliably. For example, the network can, according to a specific embodiment, increase the power offsets on the grant channel or it can, according to another embodiment, reduce the downlink load so that downlink interference is decreased and eventually the grant commands become less noisy.

According to prior art a node, e.g. Node B, can be unaware that the scheduling grants it is transmitting are unreliably received. It would therefore be beneficial to prevent the actual transmission of unreliable grants, or detect them before they even arrive at the user equipment.

Figure 5:
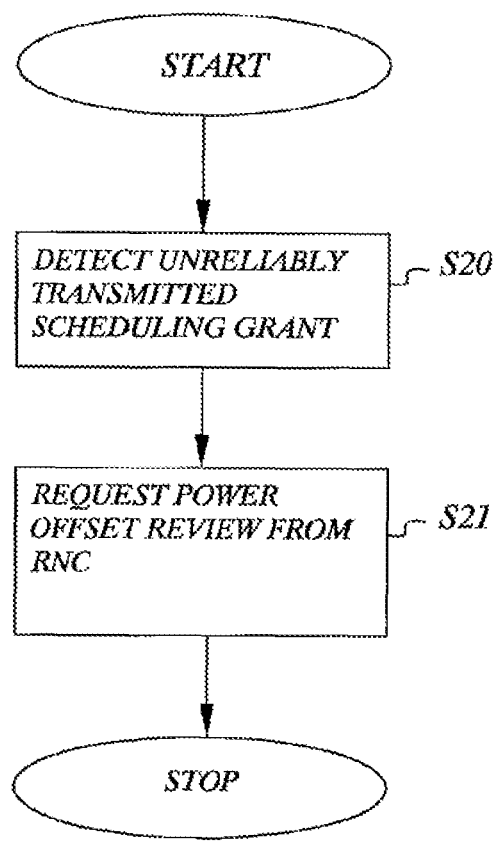
FIG. 5 is a schematic flow diagram of a further embodiment of a method according to the invention.

Therefore, according to a basic embodiment of a method, with reference to FIG. 5, comprises the Node B detecting S20 unreliably transmitted scheduling grants and subsequently requesting S21 the serving unit e.g. radio network controller RNC to review the power offset for the grant channels.

More specifically, one or more unreliable scheduling grants may in some cases result in UE transmitting either at lower or higher data rates than expected by the radio base station. For example, the combination of reliable "UP" and unreliable "DOWN" would lead to data rate that is higher than expected at the base station that transmits unreliable "DOWN"-command. This unexpected data rate can be detected S20 at the base station or Node B, which in turn can request S21 the RNC to review the power offsets of the scheduling grant channels. The RNC in turn can increase the power offset or take any appropriate action, e.g. reduce downlink load.

The impact of unreliable grants is more critical in soft handover situations as this causes the interference at the neighboring base stations. But it is also important for the UE to check the reliability of the command in single link scenarios. In the single link case there is a risk that, on the one hand, the serving cells may receive too much interference and, on the other hand, the resources may be under-utilized. In case of single link the UE simply treats an unreliable scheduling grant as "HOLD". This means the UE transmits according to the last reliable grant using the same principle as described above for the user equipment. In single link case this means:

"Unreliable=HOLD"

The UE may also utilize the UL TPC commands, as described previously, to assist the reliable detection of at least the relative scheduling grant from the serving RLS.

In case N scheduling commands are detected unreliably during a time period of $T_1$ ms, the UE can also report this event to the network, which in turn can take some RRM actions as stated in the paragraph above on reporting of unreliable grants and RRM-actions. It is also possible to use the base station power adjustments as described above.

Arrangements adapted for implementing the above-described methods will be described with reference to FIG. 6.

An embodiment of an arrangement in a user equipment according to the invention comprises a detection unit 11 for detecting unreliable received scheduling grants, an optional interpretation or evaluation unit 12 for evaluating or interpreting the unreliable received grants, and an estimation unit 13 for estimating or calculating a new serving grant for the user equipment UE based on the evaluation of the unreliable grants and possibly some other information as well. Optionally, the arrangement comprises a report unit 14 which is adapted to report an event to a serving unit of the network, e.g. radio network controller, if unreliable grants are received continuously at the user equipment UE.

According to a further embodiment, the arrangement comprises a unit for receiving uplink interference thresholds for neighboring cells in a neighboring cell list. The receiving unit is adapted to, in response to detection of unreliable grants, measure the path loss of the neighboring cell and adjust its transmit power.

Another specific embodiment comprises a unit for receiving UL TPC commands from a serving unit in the network e.g. base station, and the interpretation unit 21 is adapted to interpret the detected unreliable grants based on the UL TPC commands.

For all the above-described embodiment of the arrangement in the user equipment, the detecting unit 11 can detect single received unreliable grants and/or multiple unreliable grants.

Figure 6:
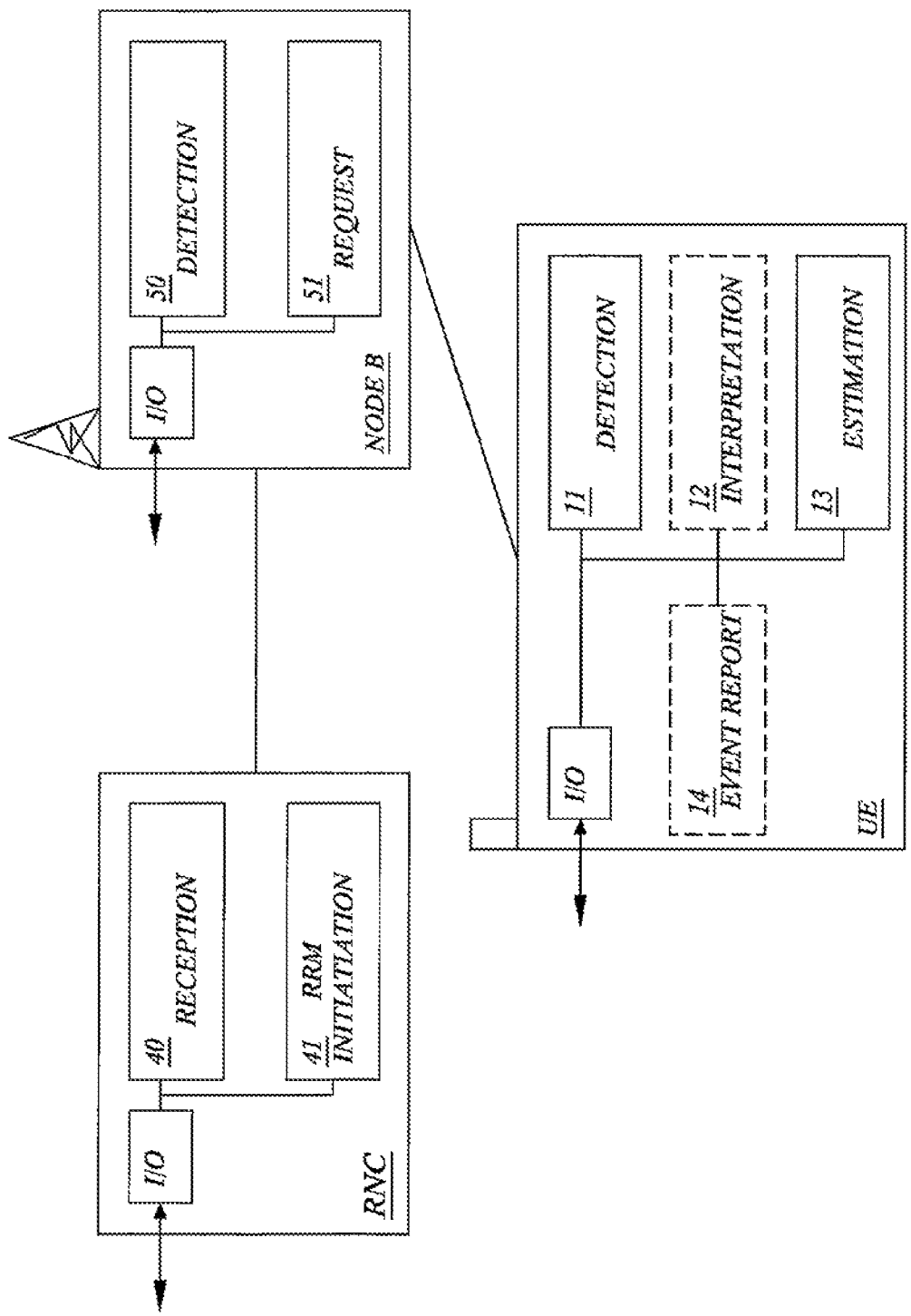
FIG. 6 is an embodiment of arrangements according to the invention.

Also with reference to FIG. 6, an embodiment of a node, e.g. Node B, in a telecommunication system comprises a detection unit 50 for detecting transmitted unreliable scheduling grants, and a request unit 51 for requesting a serving unit, e.g. radio network controller, to review and possibly adjust the power offsets for the scheduling grants channels based on the detected unreliable transmitted scheduling grants.

Also with reference to FIG. 6, an embodiment of a serving unit, e.g. radio network controller, according to the invention comprises a receiving unit 40 for receiving event reports from user equipment and an initiating unit 41 for initiating radio resource managing (RRM) procedures in response to the received event report. Such RRM actions can include increasing power offsets on the grants channel, reducing downlink load, and/or removing the unreliable radio link or replacing it with a reliable radio link.

In summary, the user equipment UE needs to detect if any of the received scheduling grants RLS are unreliable. It is thus necessary to define different ways by which the user equipment could set its new serving grant (SG) in case one or more scheduling grants are unreliable. The user equipment reports for instance an event $U_g$ to the network, e.g. the RNC, on the radio RRC signaling if N scheduling grants are unreliably received over a certain period of time. In case the network receives said $U_g$ event, the network takes an appropriate measure, for example to increase the power offset of the corresponding grant channel. Another possibility is to reduce the downlink load in corresponding cell(s), thereby decreasing interference and improving detection of the scheduling grants by the UE. In certain scenarios, the node B can detect if it is transmitting unreliable grants or not. This detection could be based on the difference between the expected bit rate and the actually transmitted bit rate of the UE. The node B can then request the RNC to adjust power offsets of the grant channels.

The present invention thus describes new methods and arrangements for user equipment and network units in case the user equipment receives unreliable scheduling grants. The user equipment detects unreliable grants, takes appropriate actions and reports an event to the network, e.g. if grants are continuously received unreliably. The network adjusts the power offset of the grant channel and/or the downlink load of the corresponding cell. The embodiments described above are merely given as examples, and it should be understood that the present invention is not limited thereto. Further modifications, changes, and improvements retaining the basic underlying principles disclosed and claimed herein are within the scope of the invention. It is also implied that the various methods and arrangements according to the invention can be combined with each other and other functionalities, without departing from the main inventive concept.

REFERENCES

[1]. 3GPP TS 25.211 "Physical channels and mapping of transport channels onto physical channels (FDD)"
[2]. 3GPP TS 25.214 "Physical layer procedures (FDD)".
[3]. 3GPP TS 25.302 "Services provided by the physical layer".
[4]. 3GPP TS 25.321 "MAC specifications".
[5]. 3GPP TS 25.331, "RRC protocol specifications".
[6]. 3GPP TS 25.101, "UE radio transmission and reception (FDD)".

The invention claimed is:

1. A method for handling unreliable scheduling grants in a serving network unit of a telecommunication network, the method comprising steps of:
   receiving, by the serving network unit, a report of an event of continuously detected received unreliable scheduling grants during a given period of time; and,
   initiating, by the serving network unit, radio resource managing procedures for a downlink to decrease downlink interference in response to the received event report.

2. The method according to claim 1, wherein said initiating step comprises a step of increasing a power offset on a grant channel associated with the continuously detected received unreliable scheduling grants to decrease the downlink interference and enable transmission of more reliable grants.

3. The method according to claim 1, wherein said initiating step comprises a step of reducing a downlink load to decrease the downlink interference and enable transmission of more reliable grants.

4. The method according to claim 1, wherein said initiating step comprises a step of removing an unreliable radio link associated with the continuously detected received unreliable scheduling grants or replacing the unreliable radio link with a reliable radio link.

5. An arrangement for handling unreliable scheduling grants in a serving network unit of a telecommunication network, comprising:
   means for receiving a report of an event of continuously detected received unreliable scheduling grants during a given period of time; and,
   means for initiating radio resource managing procedures for a downlink to decrease interference in response to the received event report.

6. The arrangement according to claim 5, wherein said serving network unit is a radio network controller.

7. The arrangement according to claim 5, wherein said initiating means increases a power offset on a grant channel associated with the continuously detected received unreliable scheduling grants to decrease the downlink interference and enable transmission of more reliable grants.

8. The arrangement according to claim 5, wherein said initiating means reduces a downlink load to decrease the downlink interference and enable transmission of more reliable grants.

9. The arrangement according to claim 5, wherein said initiating means removes an unreliable radio link associated with the continuously detected received unreliable scheduling grants or replacing the unreliable radio link with a reliable radio link.

10. A method in a radio network controller for handling unreliable scheduling grants, the method comprising steps of:
    receiving, by the radio network controller, a report of an event of continuously detected received unreliable scheduling grants during a given period of time, wherein the radio network controller receives the event report via a Node B from a user equipment; and,
    initiating, by the radio network controller, radio resource managing procedures for a downlink to decrease downlink interference from the Node B to the user equipment in response to the received event report.

11. The method according to claim 10, wherein said initiating step comprises a step of increasing a power offset on a grant channel associated with the continuously detected received unreliable scheduling grants to decrease the downlink interference and enable transmission of more reliable grants to the user equipment.

12. The method according to claim 10, wherein said initiating step comprises a step of reducing a downlink load to decrease the downlink interference and enable transmission of more reliable grants to the user equipment.

13. The method according to claim 10, wherein said initiating step comprises a step of removing an unreliable radio link associated with the continuously detected received unreliable scheduling grants or replacing the unreliable radio link with a reliable radio link.

14. A radio network controller in a telecommunication network for handling unreliable scheduling grants, the radio network controller comprising:
    a processor; and
    a memory that stores processor-executable instructions where the processor interfaces with the memory and executes the processor-executable instructions to perform operations as follows:
    receiving a report of an event of continuously detected received unreliable scheduling grants during a given period of time, wherein the radio network controller receives the event report via a Node B from a user equipment; and,
    initiating radio resource managing procedures for a downlink to decrease downlink interference from the Node B to the user equipment in response to the received event report.

15. The radio network controller according to claim 14, wherein said initiating operation comprises increasing a power offset on a grant channel associated with the continuously detected received unreliable scheduling grants to decrease the downlink interference and enable transmission of more reliable grants to the user equipment.

16. The radio network controller according to claim 14, wherein said initiating operation comprises reducing a downlink load to decrease the downlink interference and enable transmission of more reliable grants to the user equipment.

17. The radio network controller according to claim 14, wherein said initiating operation comprises removing an unreliable radio link associated with the continuously detected received unreliable scheduling grants or replacing the unreliable radio link with a reliable radio link.

\* \* \* \* \*